US010536605B2

(12) United States Patent
Morimoto

(10) Patent No.: US 10,536,605 B2
(45) Date of Patent: Jan. 14, 2020

(54) DOCUMENT READING APPARATUS THAT READS DOCUMENT IMAGES OF DOCUMENTS BY IMAGE SENSORS

(71) Applicant: KYOCERA Document Solutions Inc., Osaka (JP)

(72) Inventor: Satoshi Morimoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/104,719

(22) Filed: Aug. 17, 2018

(65) Prior Publication Data
US 2019/0058809 A1 Feb. 21, 2019

(30) Foreign Application Priority Data
Aug. 17, 2017 (JP) ................ 2017-157330

(51) Int. Cl.
H04N 1/04 (2006.01)
H04N 1/047 (2006.01)
H04N 1/00 (2006.01)
H04N 1/193 (2006.01)
H04N 1/10 (2006.01)

(52) U.S. Cl.
CPC ........ H04N 1/0473 (2013.01); H04N 1/00814 (2013.01); H04N 1/1056 (2013.01); H04N 1/1937 (2013.01)

(58) Field of Classification Search
None
See application file for complete search history.

(56) References Cited

U.S. PATENT DOCUMENTS 4,974,098 A * 11/1990 Miyakawa .......... H04N 1/4076 358/406
5,539,532 A * 7/1996 Watanabe .............. H04N 1/047 358/443

(Continued)

FOREIGN PATENT DOCUMENTS

JP 2001-245114 A 9/2001
JP 2003-143373 A 5/2003

OTHER PUBLICATIONS

China National Intellectual Property Administration. Office Action of foreign counterpart dated Aug. 29, 2019.

Primary Examiner — Cheukfan Lee
(74) Attorney, Agent, or Firm — Hawaii Patent Services; Nathaniel K. Fedde; Kenton N. Fedde

(57) ABSTRACT

Provided is an image forming apparatus capable of accurately returning a carriage to a home position without having to turn ON a light source in the process of returning the carriage to the home position. A first reading-position-detection plate is arranged inside of a reading width of a line sensor and outside of a document-image-reading width. A second color region has a length that gradually increases in the main scanning direction as going away from the home position of the carriage. A reading-position-detecting unit detects the length in the main scanning direction of the second color region on the basis of output from the line sensor. A movement-distance-converting unit converts this length to a movement distance to the home position. A movement-control unit causes the carriage to move toward the home position just the movement distance.

4 Claims, 4 Drawing Sheets

(56) References Cited

U.S. PATENT DOCUMENTS

| | | | | |
|---|---|---|---|---|
| 5,949,922 A * | 9/1999 | Wada | ................... | G06K 9/3216 358/471 |
| 6,229,629 B1 * | 5/2001 | Tsai | ....................... | H04N 1/047 358/486 |
| 6,707,582 B2 * | 3/2004 | Chen | ................... | H04N 1/0473 358/474 |
| 7,099,054 B2 * | 8/2006 | Shih | ....................... | H04N 1/047 358/474 |
| 7,116,845 B2 * | 10/2006 | Chen | ................... | H04N 1/0473 382/318 |
| 7,605,953 B2 * | 10/2009 | Crooker | ............ | H04N 1/00002 358/412 |
| 7,843,609 B2 * | 11/2010 | Caster | ............... | H04N 1/00018 358/400 |
| 8,514,460 B2 * | 8/2013 | Miyagawa | ......... | H04N 1/00002 358/448 |
| 2002/0105683 A1 * | 8/2002 | Chen | ................... | H04N 1/0473 358/462 |
| 2003/0095294 A1 * | 5/2003 | Shih | ....................... | H04N 1/047 358/497 |
| 2005/0196209 A1 * | 9/2005 | Lyu | ................... | G03G 15/607 399/376 |
| 2006/0279808 A1 * | 12/2006 | Chang | ............... | H04N 1/00002 358/505 |
| 2006/0285179 A1 * | 12/2006 | Yamada | ............... | H04N 1/0473 358/497 |
| 2010/0073737 A1 * | 3/2010 | Honda | ................. | H04N 1/0473 358/474 |
| 2011/0075229 A1 * | 3/2011 | Fujiwara | ............ | H04N 1/00002 358/488 |
| 2015/0341523 A1 * | 11/2015 | Etoh | ................... | H04N 1/1039 358/475 |
| 2017/0054872 A1 * | 2/2017 | Fusayasu | ................. | H04N 1/19 |
| 2017/0078527 A1 * | 3/2017 | Fusayasu | ........... | H04N 1/00018 |

* cited by examiner

DOCUMENT READING APPARATUS THAT READS DOCUMENT IMAGES OF DOCUMENTS BY IMAGE SENSORS

INCORPORATION BY REFERENCE

This application is based on and claims the benefit of priority from Japanese Patent Application No. 2017-157330 filed on Aug. 17, 2017, the contents of which are hereby incorporated by reference.

BACKGROUND

The present disclosure relates to a document reading apparatus that reads a document image of a document by image sensors.

A document reading apparatus includes a carriage to which a light source for irradiating light onto a document is attached, and scans a document in one-line units in a main scanning direction by an image sensor while relatively moving the carriage in a sub-scanning direction with respect to the document. In this kind of document reading apparatus, in order to correctly set a reading position of the document image, the carriage returns to a home position after scanning is complete.

Then, as a typical technique, when returning the carriage to the home position, a technique is proposed in which instead of using a special member such as an expensive photosensor or the like, the home position can be detected by providing a depression, a hole, a detection mark, or the like in a white reference portion outside of the reading area.

SUMMARY

The image forming apparatus according to the present disclosure is an image forming apparatus that reads a document image of a document by a line sensor, in which image sensors are arranged in a main scanning direction, while moving the document and a carriage, to which a light source that irradiates light on the document through a contact glass is attached, relative to sub-scanning direction. The image forming apparatus includes a reading-position-detection plate, a reading-position-detecting unit, a reading-position-detecting unit, a movement-distance-converting unit, and a movement-control unit. The reading-position-detection plate is arranged inside of a reading width of the line sensor and outside of a document-image-reading width, and have a color region, the length of which gradually decreases or gradually increases in the main scanning direction as going away from a home position of the carriage. The reading-position-detecting unit detects the length in the main scanning direction of the color region on the basis of output from the line sensor. The movement-distance-converting unit converts the length in the main scanning direction of the color region to a movement distance to the home position. The movement-control unit causes the carriage to move toward the home position just the movement distance.

DETAILED DESCRIPTION

In the following, an embodiment according to the present disclosure will be explained in detail with reference to the drawings.

Figure 1:
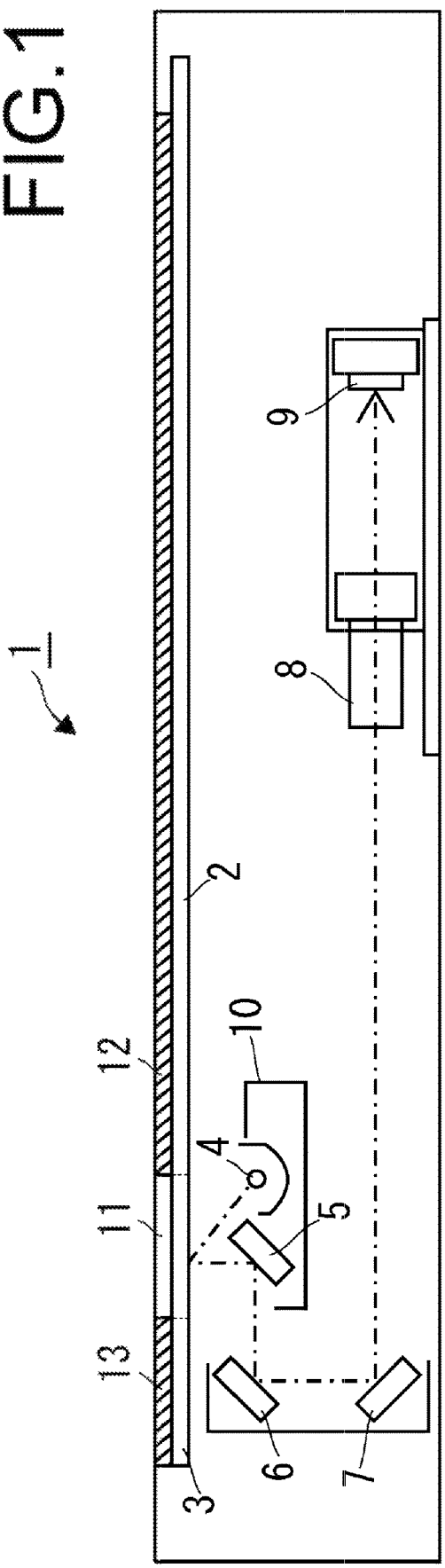
FIG. 1 is a side view illustrating the structure of an embodiment of a document reading apparatus according to the present disclosure.

Referring to FIG. 1, a document reading apparatus 1 of this embodiment includes a first contact glass 2, a second contact glass 3, a light source 4, a first mirror 5, a second mirror 6, a third mirror 7, an imaging lens 8, and a line sensor 9 arranged in the a main scanning direction. The light source 4 and the first mirror 5 are mounted on a carriage 10 that is movable in a sub-scanning direction. Incidentally, in the example illustrated in FIG. 1, the first contact glass 2 and second contact glass 3 constitute one glass plate.

Light that is irradiated from the light source 4 and reflected by a document is guided by the first mirror 5, the second mirror 6, the third mirror 7 and the imaging lens 8, and is received by the line sensor 9.

The line sensor 9 is a linear image sensor having image sensors, which include a charge coupled device (CCD) or complementary metal-oxide-semiconductor (CMOS), are arranged in the main scanning direction. In addition, the line sensor 9 is a color image sensor that outputs a document image in each of the colors: red (R), green (G) and blue (B). In the line sensor 9, for example, one image sensor is provided with a red (R), a green (G) and a blue (B) color filter and is taken to be one set, and plural sets are arranged in the main scanning direction.

The line sensor 9, by receiving reflected light from a document, outputs in a time series document images scanned in scanning line units in the main scanning direction. Incidentally, a contact image sensor (CIS) may be used as the line sensor 9 and mounted on the carriage 10.

In the case of reading a document that is placed on the first contact glass 2, the document is scanned though the first contact glass 2 while moving the carriage 10 (scanning line) in the sub-scanning direction. Moreover, in the case of reading a document that is fed from a document feeding apparatus, the carriage 10 (scanning line) is moved to a position facing the second contact glass 3, and the document that is fed from a document feeding unit is scanned through the second contact glass 3.

Figure 2:
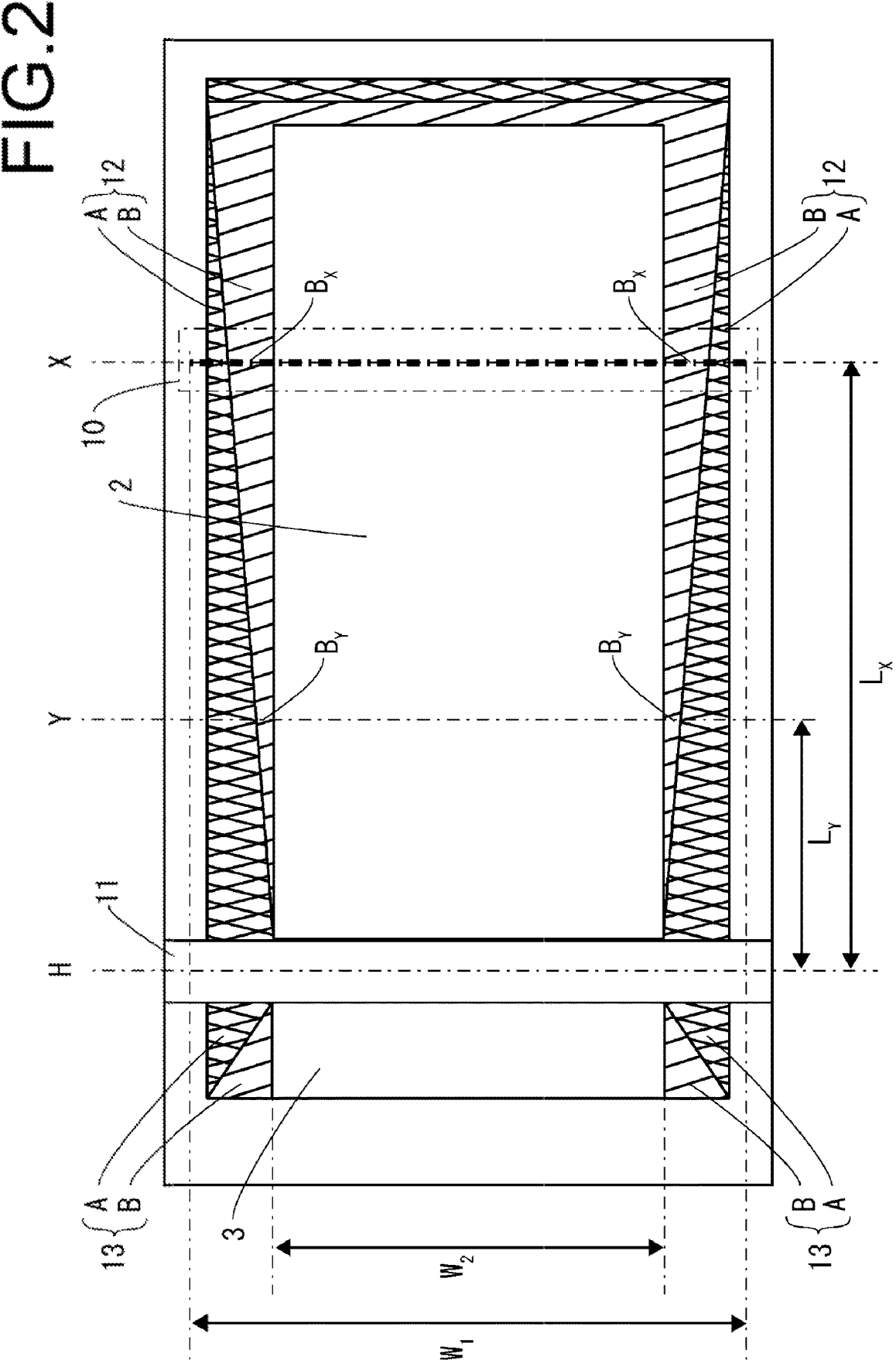
FIG. 2 is a top view as seen from the carriage side of a first contact glass and a second contact glass illustrated in FIG. 1.

Referring to FIG. 1 and FIG. 2, a white reference plate 11 for shading correction is provided on a lower surface (surface facing the carriage 10) between the first contact glass 2 and the second contact glass 3. The white reference plate 11 is a long, thin plate-shaped member that extends in the main scanning direction over the entire range of a reading width W of the line sensor 9. Incidentally, in this embodiment, a scanning line H illustrated in FIG. 2 on the white reference plate 11 is set as a home position H.

In addition, a first reading-position-detection plate 12 is provided on a lower surface on both sides in the main scanning direction of the first contract glass 2. The first reading-position-detection plate 12 is arranged on both sides of the first contact glass 2, on the inside of the reading width $W_1$ of the line sensor 9, and on the outside of the document-image-reading width $W_2$ in the main scanning direction, which is the width of the first contact glass 2.

Then, the first reading-position-detection plate 12 has a first color region A in which the length in the main scanning direction gradually decreases as the scanning line moves away from the home position H, and a second color region B adjacent in the main scanning direction, and in which the length in the main scanning direction gradually increases as the scanning line moves away from the home position H. The first color region A and the second color region B are colored with different colors. As a result, the boundary between the first color region A and the second color region B can be distinguished, and each of the lengths in the main scanning direction, which are the first color region A and the second color region B, can be detected by the output from the line sensor 9.

The color of one of the first color region A and the second color region B is set to any one of the colors red (R), green (G) and blue (B), and the other of the first color region A and the second color region B is set to a color that does not include the color component of the one. For example, in the case where the first color region A is set to blue (B), the second color region B is set to black, red (R), green (G) or the like. As a result, the first color region A and the second color region B can be easily distinguished in the output from the line sensor 9.

Furthermore, a second reading-position-detection plate 13 having similar configuration to that of the first reading-position-detection plate 12 is also provided on the lower surface on both sides in the main scanning direction of the second contact glass 3. Incidentally, the second reading-position-detection plate 13 has similar configuration to that of the first reading-position-detection plate 12, and is only shorter in length in the sub-scanning direction, so an explanation thereof is omitted.

Figure 3:
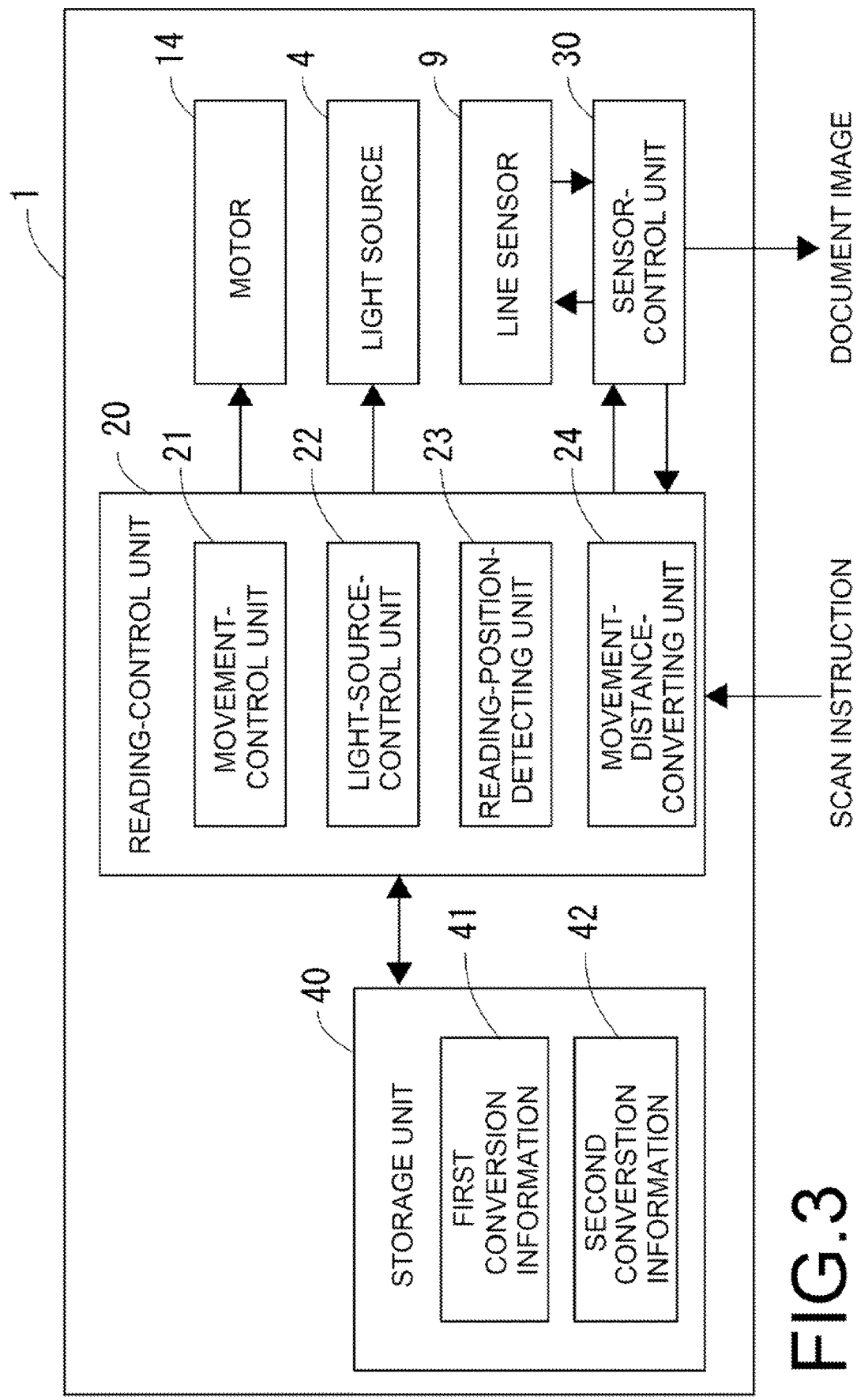
FIG. 3 is a block diagram schematically illustrating an embodiment of a document reading apparatus according to the present disclosure.

Referring to FIG. 3, the document reading apparatus 1 includes a motor 14, a reading-control unit 20, a sensor-control unit 30 and a storage unit 40.

The motor 14 is a power-generating unit that generates motive power to move the carriage 10 in the sub-scanning direction, and is configured by a stepping motor or a DC motor.

The reading-control unit 20 is an arithmetic processing circuit such as a microcomputer or the like that includes a central processing unit (CPU), a read only memory (ROM), a random access memory (RAM) and the like. The ROM stores a control program for performing control of the operation of the document reading apparatus 1. The reading-control unit 20 performs overall control of the apparatus by reading the control program stored in the ROM, and developing the control program in the RAM.

In addition, the reading-control unit 20 functions as a movement-control unit 21, a light-source-control unit 22, a reading-position-detecting unit 23, and a movement-distance-converting unit 24.

The sensor-control unit 30 is a driver that controls the operation of the line sensor 9 on the basis of an instruction from the reading-control unit 20, and is configured by an application specific integrated circuit (ASIC) or the like.

The storage unit 40 is a storage unit such as a semiconductor memory or the like. The storage unit 40 stores first conversion information 41 and second conversion information 42. The first conversion information 41 is information for converting the length in the main scanning direction of the first reading-position-detection plate 12 (first color region A or second color region B) to the movement distance to the home position H. The second conversion information 42 is information for converting the length in the main scanning direction of the second reading-position-detection plate 13 (first color region A or second color region B) to the movement distance to the home position H.

The movement-control unit 21 moves the carriage 10 in the sub-scanning direction by controlling the rotation of the motor 14. In the case where the motor 14 is a stepping motor, the movement-control unit 21 moves the carriage 10 in the sub-scanning direction using a pulse signal that controls the rotation angle of the motor 14.

The light-source-control unit 22 controls lighting of the light source 4. The light-source-control unit 22 turns ON the light source 4 at the timing of reading a document image by the line sensor 9.

In the case where the carriage 10 is positioned on the first contact glass 2, the reading-position-detecting unit 23 detects the length in the main scanning direction of the first reading-position-detection plate 12 (first color region A or second color region B) on the basis of output from the line sensor 9. Moreover, in the case where the carriage 10 is positioned on the second contact glass 3, the reading-position-detecting unit 23 detects the length in the main scanning direction of the second reading-position-detection plate 13 (first color region A or second color region B) on the basis of output from the line sensor 9.

By referring to the first conversion information 41, the movement-distance-converting unit 24 converts the length in the main scanning direction of the first reading-position-detection plate 12 (first color region A or second color region B) to the movement distance to the home position H. Together with this, by referring to the second conversion information 42, the movement-distance-converting unit 24 converts the length in the main scanning direction of the second reading-position-detection plate 13 (first color region A or second color region B) to the movement distance to the home position H.

Figure 4:
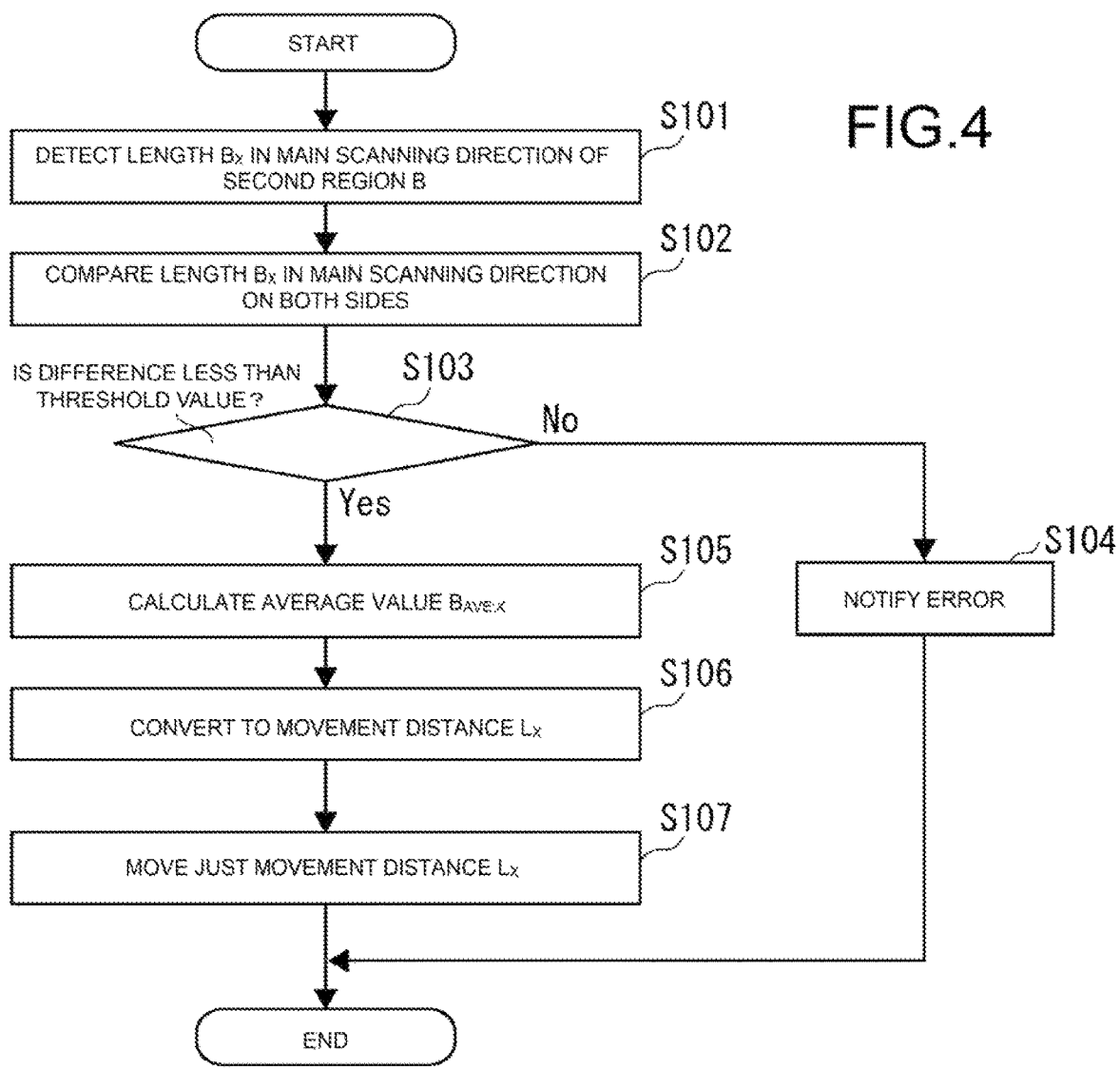
FIG. 4 is a flowchart for explaining the return operation of returning the carriage illustrated in FIG. 1 to a home position.

Next, the return operation for returning the carriage 10 to the home position H will be explained in detail with reference to FIG. 4. In the following, the case is explained in which the first color region A is taken to be black and the second color region B is taken to be blue, and the reading-position-detecting unit 23 detects the length in the main scanning direction of the second color region B by the output from the line sensor 9.

An instruction to scan a document that is placed on the first contact glass 2 is inputted from an operation unit or from the outside. Then, the reading-control unit 20, as the light-source-control unit 22, turns ON the light source 4, instructs the sensor-control unit 30 to read the white reference plate 11, and causes the line sensor 9 to acquire white reference data for shading correction.

Next, the reading-control unit 20, as the movement-control unit 21, controls the rotation of the motor 14, causes the carriage 10 to move in the sub-scanning direction, and instructs the sensor-control unit 30 to read the document image in synchronization with the movement of the carriage 10. As a result, the document image read in scanning line units by the line sensor 9 is converted to digital data by the sensor-control unit 30, and is outputted after shading correction and the like has been performed.

After reading of the document ends, the reading-control unit 20 functions as the movement-control unit 21 and returns the carriage 10 that has been moved in the sub-scanning direction to the home position H. At this time, the reading-control unit 20 first functions as the reading-position-detecting unit 23. The reading-position-detecting unit 23, on the basis of output from the line sensor 9, detects the length $B_X$ in the main scanning direction of the first readingposition-detection plate 12 (first color region A or second color region B) at the scanning line X where the carriage 10 is located (step S101).

Incidentally, in step S101, the reading-position-detecting unit 23 respectively detects the length $B_X$ in the main scanning direction of the first reading-position-detection plate 12 (first color region A or second color region B) at the scanning line X on both sides of the first contact glass 2.

Then, the reading-position-detecting unit 23 compares the lengths $B_X$ in the main scanning direction on both sides (step S102), and determines whether or not the difference is less than a preset threshold value (step S103).

In step S103, in the case where the difference is equal to or greater than the threshold value, means that the inclination of the carriage 10 is large. Therefore, the reading-position-detecting unit 23 notifies the user of an error (step S104) and ends operation.

In step S103, in the case where the difference is less than the threshold value, the reading-position-detecting unit 23 calculates the average value $B_{AVE:X}$ of the lengths $B_X$ in the main scanning direction on both sides (step S105). As a result, the reading position can be accurately detected even in the case where the carriage 10 is slightly inclined.

Next, by referencing the first conversion information 41, the reading-control unit 20 functions as the movement-distance-converting unit 24, and convert the average value $B_{AVE:X}$ to the movement distance $L_x$ to the home position H (step S106).

Then, the reading-control unit 20 functions as the movement-control unit 21, and causes the carriage 10 to move toward the home position H just the movement distance $L_x$ converted in step S105 (step S107) and ends the return operation. During this movement, the line sensor 9 does not need to perform reading, and the light source 4 does not need to be ON. Then, since the movement distance $L_x$ is accurately known, it is not necessary to provide a depression, hole or detection mark in the vicinity of the home position H.

An example of returning the carriage 10 from a position facing the first contact glass 2 to the home position H is explained above, however, a similar operation is also executed in the case of returning the carriage 10 from a position facing the second contact glass 3 to the home position H.

Incidentally, the case where the movement distance $L_x$ converted in step S106 is longer than the preset threshold distance will be explained. In this case, as illustrated in FIG. 2, when moving toward the home position H, the lengths $B_Y$ in the main scanning direction of the first reading-position-detection plates 12 (first color region A or second color region B) at the scanning line Y on both sides of the first contact glass 2 may be respectively detected. Then the movement distance $L_Y$ to the home position H may be determine.

In this case, the movement-control unit 21 can compare a movement distance Z from the scanning line X to the scanning line Y recognized by the movement-control unit 21 itself, and the actual movement distance ($L_X$–$L_Y$). Then, the case in which error occurs in the self-recognized movement distance Z and the actual movement distance ($L_X$–$L_Y$) will be explained. In this case, by correcting the movement control of the movement distance $L_Y$ on the basis of this error (for example, correcting the movement distance $L_Y$ to $L_Y \times (L_X-L_Y)/Z$), the carriage 10 can be returned to the home position H more accurately.

As explained above, according to this embodiment, a document reading apparatus 1 reads a document image of a document by a line sensor 9, in which image sensors are arranged in a main scanning direction, while moving the document and a carriage 10, to which a light source 4 that irradiates light on the document through a first contact glass 2 is attached, relative to sub-scanning direction, and this document reading apparatus 1 includes: a first reading-position-detection plate 12 that has a second color region B, the length of which gradually increases in the main scanning direction as going away from a home position H of the carriage 10; a reading-position-detecting unit 23 that detects the length $B_X$ in the main scanning direction of the second color region B on the basis of output from the line sensor 9; a movement-distance-converting unit 24 that converts the length $B_X$ in the main scanning direction of the second color region B to a movement distance $L_X$ to the home position H; and a movement-control unit 21 that causes the carriage 10 to move toward the home position H just the movement distance $L_X$.

With this configuration, the movement distance $L_X$ from the current position of the carriage 10 to the home position H is accurately determinable, so in the process of returning that carriage 10 to the home position H, the light source does not have to be ON, and the carriage 10 can be accurately returned to the home position.

Furthermore, in this embodiment, in the first reading-position-detection plate 12, the second color region B is set to any one of the colors red, green and blue, and the first color region A that is adjacent to the second color region B in the main scanning direction is set to a color that does not include the color component of the second color region B.

With this configuration, the second color region B can be easily distinguished in the output from the line sensor 9.

In addition, in this embodiment, the second color region B is respectively arranged on both sides of the document-image-reading width $W_2$, the image-position-detecting unit 23 calculates the average value of the lengths in the main scanning direction of the second color region B arranged on both sides, and the movement-distance-conversion unit 21 converts the average value to the movement distance $L_X$ to the home position H.

With this configuration, the reading position can be accurately detected even in the case where the carriage 10 is slightly inclined.

Moreover, in this embodiment, during movement of the carriage 10 by the movement-control unit 21, together with the reading-position-detecting unit 23 detecting the length $B_Y$ in the main scanning direction of the second color region B, the movement-distance-converting unit 24 converts the length $B_Y$ in the main scanning direction of the second color region B to a movement distance Ly to the home position H, and the movement-control unit 21 corrects the movement control on the basis of the error between the movement distance Z recognized by the movement-control unit 21 itself and the actual movement distance ($L_X$–$L_Y$).

In the typical technique described above, it is necessary to turn ON the light source in the process of returning the carriage to the home position, and to monitor the detection of a depression, hole or detection mark, so there is a problem in that the light source must be turned ON unnecessarily. Moreover, in the case of using a depression or a hole, irregular reflection of light from the light source is used, so irregularities may occur in the detection data due to the way light is reflected. Furthermore, in the case of detecting the home position using a detection mark in the white reference portion, and when there is deviation between the position where the detection mark is applied and the printing position, the starting position for reading will shift.

The present disclosure takes into consideration the problems described above, with the object of the present disclosure being to provide an image reading apparatus capable of accurately returning the carriage to the home position without having to turn ON the light source in the process of returning the carriage to the home position.

The technique according to the present disclosure has an advantage in that the movement distance from the current position of the carriage to the home position is accurately determinable, so the carriage can be accurately returned to the home position without having to turn ON the light source in the process of returning the carriage to the home position.

Incidentally, the technique according to the present disclosure is not limited to the embodiments described above, and it is clearly understood that each of the embodiments may be appropriately modified within the scope of the technical idea of the present disclosure. Moreover, the number, position, shape and the like of the components described above are not limited to those in the embodiments described above, and a number, position, shape and the like suitable for embodying the technology according to the present disclosure may be used. Incidentally, in each of the drawings, the same reference numbers are used for components that are the same.

What is claimed is:

1. An image forming apparatus that reads a document image of a document by a line sensor, in which image sensors are arranged in a main scanning direction, while moving the document and a carriage, to which a light source that irradiates light on the document through a contact glass is attached, relative to each other in a sub-scanning direction, the document reading apparatus comprising:
    a reading-position-detection plate arranged inside of a reading width of the line sensor and outside of a document-image-reading width, and having a color region, the length of which gradually decreases or gradually increases in the main scanning direction as going away from a home position of the carriage;
    a reading-position-detecting unit that detects the length in the main scanning direction of the color region on the basis of an output from the line sensor;
    a movement-distance-converting unit that converts the length in the main scanning direction of the color region to a movement distance to the home position; and
    a movement-control unit that causes the carriage to move toward the home position by the movement distance.

2. The image forming apparatus according to claim 1, wherein in the reading-position-detection plate, the color region is set to any one of colors red, green and blue, and a region that is adjacent to the color region in the main scanning direction is set to a color that does not include a color component of the color region.

3. The image forming apparatus according to claim 1, wherein
    the color region is respectively arranged on both sides of the document-image-reading width,
    the image-position-detecting unit calculates an average value of the lengths in the main scanning direction of the color region arranged on both sides, and
    the movement-distance-conversion unit converts the average value to the movement distance to the home position.

4. The image forming apparatus according to claim 1, wherein
    during movement of the carriage by the movement-control unit, together with the reading-position-detecting unit detecting the length in the main scanning direction of the color region, the movement-distance-converting unit converts the length in the main scanning direction of the color region to a movement distance to the home position, and
    the movement-control unit corrects movement control on the basis of an error between a movement distance recognized by the movement-control unit itself and an actual movement distance.

* * * * *